Figure 1:
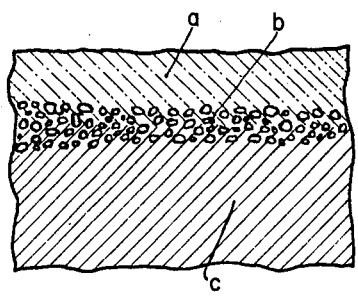

Feb. 4, 1964   E. FITZER ETAL   3,120,453
POROUS CARBONACEOUS BODY WITH SEALED SURFACE FOR USE
AS ARC-FURNACE ELECTRODE OR STRUCTURAL
COMPONENT OF NUCLEAR REACTORS
Filed Nov. 18, 1958

United States Patent Office 3,120,453
Patented Feb. 4, 1964

3,120,453
POROUS CARBONACEOUS BODY WITH SEALED SURFACE FOR USE AS ARC-FURNACE ELECTRODE OR STRUCTURAL COMPONENT OF NUCLEAR REACTORS
Erich Fitzer and Ottmar Rubisch, Meitingen, near Augsburg, Germany, assignors to Siemens-Planiawerke Aktiengesellschaft für Kohlefabrikate, Meitingen, near Augsburg, Germany, a corporation of Germany
Filed Nov. 18, 1958, Ser. No. 774,773
Claims priority, application Germany Nov. 22, 1957
23 Claims. (Cl. 117—217)

Our invention relates to shaped bodies of pourous carbonaceous materials, such as graphite, coke, silicon carbide and other carbons by example for use as arc electrodes, as structural components in nuclear power reactors or for similar purposes requiring a thermally or electrically conducting and refractory carbonaceous body, though generally porous, to possess a gas and liquid-tight surface.

It is an object of our invention to improve such bodies by providing them with a surface coating that not only secures maximum protection of the porous carbonaceous material from oxidation, burn-off or other attack at high temperatures, but also maintains or improves the good thermal or electrical conductivity desired for the above-mentioned uses.

The surface of carbon electrodes for furnaces must be protected from oxidation by presenting oxygen from having access to the carbon substance proper. Structural components for nuclear reactors, preferably consisting of graphite, must also possess a sealed surface so that gaseous or liquid coolants or moderators cannot penetrate into the pores of the component but are strictly confined to the prescribed flow path.

It is known to provide steel-furnace electrodes with a protective coating to reduce consumption of the carbon by combustion which, in conventional bare electrodes, accounts for about 60% of the carbon losses. If such burn-off can be reduced, an outstanding economical advantage is obtained. The great percentage of carbon burn-off is primarily due to the fact that, in the vicinity of the arc, the electrode burns down to a steeply conical taper. The resulting reduction in conducting cross-section and the corresponding increase in electric resistance cause the pointed taper to be additionally heated by Joule's heat. The increase in resistance also causes voltage losses, and the current in the arc declines accordingly. Hence, for making such an electrode suitable for sustaining high electric loads, the supply of current to the arc must be secured by reducing the electric resistance in the electrode or along its surface. However, the above-mentioned electrode coatings for protection from combustion consist of high-melting constituents which comprise highly refractory oxides. Such coatings are insulators or very poor electrical conductors and hence must be disposed beneath the contact cheeks of the electrodes. Even so, the oxidation-preventing coatings do not contribute to the desired good conductance of the electrode and impair the maintenance of an optimum current supply up to the immediate vicinity of the arc.

It is also known to provide carbon electrodes with a protective coating of metal consisting of a galvanically deposited copper layer and a surface layer of chromium. Such a metallic coating tends to melt away near the arc so that the desired burn-off protection is prematurely lost. Protective coatings containing essentially metallic oxides, while resistant to oxidation, are poor electric conductors and tend to scale off since they are not chemically bonded to the carbon and in some cases are chemically reduced by the carbon.

Better results are obtained if the protective coatings consists of metal carbides that are electrically conducting. For example, it is known to coat carbon electrodes with silicon carbide or zirconium carbide. However, the burn-off protection is slight because such carbide coatings are not free of pores or fissures, so that the electrode carbon will oxidize and burn out at fault locations.

It is, therefore, one of the more specific objects of our invention to obviate the detrimental effects of faulty spots in a protective carbide coating on a body of carbon and to increase the electric conductance of the protective coating.

To this end, and in accordance with a feature of our invention, the coating is formed of a refractory metal carbide layer anchored in the carbon body, and a covering layer consisting of high-melting metals, or alloys of metals, from the $a$ portion of each of the fourth to sixth groups of the periodic system of elements, the shaped main body of porous carbon or the like carbonaceous substance, the intermediate refractory carbide layer and the metallic cover layer being intimately bonded and merged together to form a single, integral structure.

We have found that the saturated carbides of titanium, zirconium, silicon, chromium and molybdenum, or mixtures thereof are particularly well suitable for the intermediate carbide layer. Titanium carbide, zirconium carbide and silicon carbide are preferentially applicable in many cases.

The metal, or main metal component of the electrically conductive cover layer may consist of one or more of titanium, zirconium, silicon, chromium and molybdenum, either in form of the metal itself or in form of an alloy or electrically conducting compound. The metal or main metal component of the cover layer may differ from the carbide-forming metal of the intermediate layer, but it may also be identical with the carbide-forming metal as will more fully appear hereinafter.

According to another feature of the invention, the metallic cover layer as well as the underlying carbide layer may aditionally contain other metallically conducting compounds of the metals of the $a$ groups from IVa to VIa of the periodic system with nitrogen, beryllium, boron, aluminum, silicon or phosphorus. Examples of such additional compounds are $TiSi_2$, $TiN$, $Cr_3Si$.

The cover layer, instead of consisting of the high-melting metals or alloys above specified, may also be formed of metallically conducting compounds of such metals. Suitable compounds are those formed by the particular metals with the elements of the last-mentioned group, namely N, Be, B, Al, Si or P. Preferably used are silicides of the particular metal, such as $TiSi_2$.

Generally, the metallic elements throughout the stratified coating, namely the metals to be used in form of a carbide in the intermediate layer and in form of the metal, alloy or the above-mentioned compounds in the outer layer, are those that form stable and metallically conducting carbides in order to secure a fast-adhering bond between these carbides with the main substance of the electrode even under maximum changes in temperature occurring during the intended high-temperature use.

It has been found particularly favorable to embed and distribute in the metallic cover layer such hard and highly refractory materials as carbides, nitrides, silicides or borides in order to prevent grain coarsening of the metal layer when being deposited, wihch coarsening would tend to make the cover layer scale off.

The carbides of the intermediate layer adhere particularly well to the surface of the carbon body because they form with the carbon substance the carbide of the particular metal that can be deposited upon the carbon body. For this reason it is essential that the intermediate layer consist of a carbide which is well anchored in the porous carbon structure of the body. The outer metal layer adheres to such an intermediate carbide layer more readily and more firmly than to the carbon body itself because a metal carbide is wetted by liquefied metal to a greater extent than the carbon substance. This explains why a stratified coating according to the invention exhibits a particularly firm and reliable connection with the main body of the electrode and is not affected by high temperatures nearly up to the melting point of the metal carbide and metal being used. The stratified coating is further distinguished by high electric conductivity and is particularly dense so that no oxidizing atmosphere can reach the carbon at temperatures up to near the melting point of the protective coating.

Various methods of forming the carbide intermediate layer and the metallically conducting cover layer on a molded or extruded carbon body will be described below with reference to specific examples. In principle, two different ways are available. One way is to produce the carbide layer directly upon the porous carbon body by first depositing a metal on the carbon and then subjecting the carbon to incandescent reaction temperature, thus producing the carbide directly in contact with the carbon body. The other way is to start from a metal carbide and to deposit it on the shaped carbon body, for example in form of a paste, and to subsequently bond the carbide to the carbon body by processing at incandescent temperature.

The electrically good conducting cover layer of high-melting metal can be deposited upon the carbide layer by immersing the carbide-covered carbon body in a melt of the metal, by spraying the metal upon the carbide layer, by depositing the metal from the vaporous phase, or galvanically. For forming the required good bond of the cover layer with the carbide layer, the cover layer deposited upon the carbon body must be burned-in, preferably by applying a temperature of about 1000° C. or more in an inert atmosphere. For this purpose, the cover layer of metal, or metal silicide to be formed upon the carbide layer can be heated to melting temperature either before using the carbon body as an electrode or during such use.

In most cases, the stratified coating is preferably formed by a two-step method. At first the carbide intermediate layer is formed on the carbon body, and subsequently the cover layer of high-melting metal, alloy or conducting compound is deposited. However, it is also possible to employ a single-step method by forming the carbide layer and simultaneously covering it with a metallically conducting cover layer.

Figure 2:
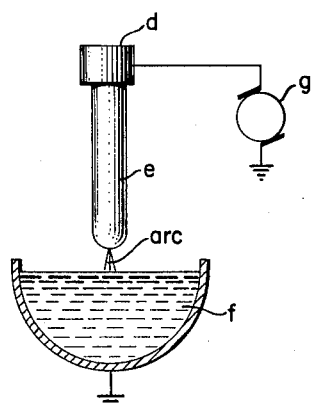

FIG. 1 is a fragmentary cross section on an enlarged scale of a body according to the invention; and FIG. 2 is a diagrammatic illustration of an electrode body according to the invention and electrical circuit as it may be used in an electric arc furnace.

For further explanation, there is shown in FIG. 1 of the drawing a cross-sectional view on enlarged scale of a coated carbonaceous body according to the invention. It comprises a porous body $c$ of graphite intimately bonded with a cover layer $a$ of high melting metal. The material of the cover layer penetrates into the rather irregular and fissured carbide layer $b$ and the carbide layer penetrates into the marginal pores of the carbon body, so that all layers merge and form a single refractory and electrically conductive body, such as the body of a furnace electrode, or a carbon block for use in the core structure, reflector or other structural portion of a nuclear reactor.

Stratified coaitngs according to the invention are applicable to various types of molded or extruded industrial carbons of natural and synthetic origin as well as to silicon carbide. When using the invention with bodies of natural graphite, it affords the additional advantage of mechanically strengthening such bodies by the formation of the double-layer coating.

As shown in FIG. 2, the electrode body $e$, with its stratified coating as above described, is connected at only one end thereof by a terminal or other connecting means $d$ to a grounded generator or source of electric current $g$. The other end of electrode $e$ is free. The metal to be melted is placed in a furnace F which is also grounded. An arc is thus produced between the electrode $e$ and the metal in furnace $f$.

The invention will be further described with reference to the following examples:

Example 1

Graphite electrodes for electric steel furnaces were coated with a mixture of about 90% $VSi_2$ and about 10% TiC in a 5% alcoholic solution of polyvinyl alcohol. The coated electrodes were passed through a channel furnace heated to 200° C. Thereafter the dried graphite electrodes were rapidly heated to 1600° C. in an inert atmosphere by direct resistance heating, that is by passing electric current through the electrodes. The electrodes were then permitted to cool slowly to room temperature. A mitxure of titanium hydride and silicon was deposited upon the carbide-coated electrodes. The titanium and silicon in the mixture was in the stoichiometric atomic ratio of 1:2. The body thus coated was heated to the reaction temperature of 1350° C. which resulted in the formation of a $TiSi_2$ layer. This layer was melted by the heat of reaction and penetrated into the surface of the underlying carbide layer. A continuous TiC intermediate layer ($b$ on the drawing) intimately bonded with the graphite body ($c$) was formed and was merged with, and densely covered by, a continuous titanium disilicide surface zone ($a$). Similar results were obtained by the same method when using for the first coating somewhat differently composed polyvinyl alcohol solutions $TiSi_2$ and TiC within the range of 85% to 97.5% $TiSi_2$ and 2.5% to 15% TiC, all percentages being by weight.

Example 2

Graphite electrodes for electric steel furnaces were coated with titanium metal by means of an acetylene blower, using a titanium wire. The coated electrodes were passed through a channel furnace at 800° to 1000° C. within a period of about 15 minutes. The furnace contained a reactive atmosphere of nitrogen. As a result, a bonded TiC layer was formed in the junction zone between graphite and titanium, whereas the surface of the coated electrode was covered with oxidation resistant TiN.

Example 3

High-intensity arc electrodes were coated with Cr powder in a binding agent consisting of a 10% dextrin solution, and then dried in a drying cabinet at 110° C. for 30 minutes. Then the electrodes were shoved into a carbon-tube furnace preheated to about 1900° C. and were thus rapidly heated in an argon atmosphere up to the melting point of the chromium. After a few seconds, the temperature was reduced to about 1200° C. and this temperature was maintained about 3 to 10 minutes for tempering the carbon bodies.

The melting operation resulted in the formation of a uniform chromium coating firmly adhering to the carbon surface. The tempering process produced in the C—Cr fusion zone an intermediate layer of $Cr_3C_2$ a few microns thick. A chromium layer of about the same thickness remained at the surface due to the fact that the surface zone of the chromium layer was not reacted with C. The intermediate layer of $Cr_3C_2$ and the covering layer of Cr showed excellent adherence even under extreme alternating thermal stresses. The electrodes permitted an increased current loading with reduced burning of the electrode material.

Example 4

Welding carbons were coated by spraying with a mixture of about 80% by weight of Cr₃Si and about 20% of Ti to which were added 15 parts by weight of ethyl silicate per 100 parts solids, in a solution of alcohol of 75% concentraiton. The carbon electrodes thus coated were dried at 110° C. for two hours. The dried electrodes were individually packed in α-Al₂O₃ powder and were heated to the melting point of the coating metal and silicide in an induction furnace under protective gas atmosphere. The electrodes then removed from the furnace exhibited a fusion of the carbon surface with the metal silicide mixture under partial formation of carbide. Thereafter another coating of titanium was sprayed onto the electrodes. The electrodes thus coated exhibited, in comparison with the original bare electrodes, a much more quiet operation and slower burn-off similar to jacketed electrodes. Similar results were obtained by the same method when using for the first coating somewhat differently composed Cr₃Si—Ti mixtures within the range of 70% to 95% Cr₃Si and 30 to 5 Ti by weight.

Before describing examples relating to carbonaceous bodies for use as structural components in nuclear reactors, the following explanations will be of interest.

Graphite is one of the most important structural materials for nuclear reactors, because its small absorption cross-section for thermal neutron affords a good neutron economy and because this material is resistant to highest temperatures. Silicon carbide, in principle, is also applicable as structural material in nuclear reactors because of its slight neutron absorption. Particularly significant is the good electrical and thermal conductivity of these two materials, greatly exceeding in this respect such other refractory materials as ceramics. Furthermore, the moderating effect of the carbon structures can be utilized in thermal reactors.

However, an essential disadvantage of these carbonaceous materials is their porosity. As a result, any coolants such as gases or liquids are not strictly confined to the prescribed path but may penetrate into the porous material. With sodium-graphite reactors, such penetration increases the absorption cross section due to the sodium coolant remaining in the pores. In water-cooled reactors any steam formation in the pores is detrimental and may damage or destroy the material. In gas-cooled reactors, the gaseous coolants, under the effect of radiation, may cause combustion in the pores already below the otherwise critical temperature. This causes loosening of the texture within the carbonaceous material. Furthermore, graphite and silicon carbide are not suitable as canning materials because their porosity permits radioactive fission products to penetrate and to contaminate the coolant.

By virtue of the present invention such porous carbonaceous substances are made impermeable to liquid and gas thus greatly improving the utility of these materials for use in nuclear reactors and in some cases affording for the first time the possibility of using these materials for nuclear-reactor purposes to which they were not previously amenable.

It is known as such to make graphite and silicon carbide gas- and liquid-tight. In sodium-graphite reactors, for example, the graphite components have been jacketed in a sheet metal sleeve or zirconium. This is expensive and requires large quantities of metal which, besides, impairs the neutron economy. It is also known to make graphite gas- and liquid-tight by means of synthetic resins. Such sealing is limited to temperatures below 200° C. and hence is of limited applicability for nuclear reactors.

It is further known to provide graphite with oxide coatings. Such coatings, however, are not in direct thermal equilibrium with the carbon, so that the application of high temperatures causes reactions to occur in the protective coating with the effect of causing it to scale off.

Another known method of sealing graphite is to provide it with filler materials of the same type as the graphite, namely pyrolytically segregated carbon or reduced graphitic acid. These methods have not resulted in a really impervious graphite.

All these difficulties are eliminated by the present invention, namely by providing the shaped carbonaceous body with a metallically conducting coating comprising a high melting or virtually non-meltable intermediate layer of carbide, and an outer layer of metal or metal silicide formed of one or more metals of the *a* groups from IV*a* to VI*a* of the periodic system.

It is known to use silicon carbide coatings on graphite as protection from oxidation. Although such protective carbide layers satisfactorily delay consumption by burning, they are not completely tight to liquid and gas. Silicon carbide is not meltable and therefore forms only a crystalline layer whose texture is similar to that of a sintered ceramic body. Consequently, some porosity will always remain. If such a silicon carbide coating is used only for protection from oxidation, the pores may be temporarily clogged by the evolving silicic acid. This, however, does not take place when using the material in nuclear reactors operating with non-oxidizing coolants. Furthermore, such coatings are not resistant to alkali metals.

It is also known to use silicide coatings, for example MoSi₂ or TiSi₂ on graphite for protection from burn-off. The effect of such silicide layers is predicated upon partial conversion of these layers into vitreous SiO₂— skin layers which are very dense and which temporarily cover fissures in the coating. These coatings, however, are not readily applicable in the construction of nuclear reactors because the latter purpose does not as much call for oxidation resistance as for gas tightness which is to be effective also with respect to inert substances. Furthermore, the protective effect must occur already at relatively low temperatures, for example somewhat above 100° C. Such absolute sealing, not obtainable with the known silicon carbide and silicide coatings, is achieved by virtue of the invention, namely by applying an intermediate carbide layer and a cover layer of metal or metal-silicide.

As with furnace electrodes, the intermediate layer of carbide is indispensable because when melting a metal or metal silicide cover layer upon the carbonaceous body without previously providing the body with the carbide layer, the substance of the cover layer will react with the carbon or silicon carbide of the body. This may result in converting the cover layer into a porous compound, namely a carbide or silicide, with the effect of causing the cover layer to scale off when solidifying from the fused state. Besides, it is also essential for the invention to obtain the desired sealed surface zone on the shaped carbonaceous body not only by virtue of the cover layer but also by filling the pores in the fusion zone with layer-forming elements, thus obtaining a double-acting seal.

It is further essential to select as carbide forming substances for the purposes of the invention, such metals that possess a high affinity to carbon and thus form very rapidly a stable and high-melting or non-meltable carbide capable of acting as an effective barrier to the penetration of solid carbon by diffusion. As in the case of the furnace electrodes dealt with above, we found that titanium is well suitable for nuclear-reactor purposes. Particularly favorable, however, is zirconium. The tendency of zirconium to form a carbide is somewhat inferior to that of titanium. Hence, when depositing the zirconium upon the carbonaceous body, the formation of a carbide barrier layer does not take place as spontaneously as with titanium. This results in a better filling of the marginal pores and thus secures a better anchoring of the carbide layer upon the carbonaceous body, and the desired sealing of the surface zone penetrates to a greater depth. Silicon is even more tardy in forming carbides. When using silicon for forming the carbide intermediate layer, it penetrates very deeply into the carbonaceous material of the shaped body, this phenomenon being known as such from methods for manufacturing shaped bodies of silicon carbide.

In comparison with the known method of depositing silicides or metals upon graphite without an intermediate carbide layer, the invention provides a greatly superior adherence of the cover layer due to better wetting and due to the exclusion of carbide-forming reactions in the sealed skin layer.

All following examples relate to shaped carbonaceous bodies for use as structural components of nuclear reactors.

*Example 5*

Shaped graphite bodies were given a sealed surface coating as follows. The shaped body was first coated with a layer of zirconium of 0.05 to 0.1 mm. This was done by spraying zirconium wire onto the surface with an oxyhydrogen or acetylene blow pipe. The coated graphite bodies were heated in a graphite tube furnace with a carbon monoxide (CO) atmosphere for one hour at a temperature of 1800° C. Thereafter the temperature was increased to 2500° C. After maintaining the increased temperature for one-half hour, all metal was found converted into carbide. The bodies, removed from the furnace and now coated with a layer ($b$ on the drawing) of zirconium carbide (ZrC), were again coated with zirconium in the above-described manner and were then subjected at 1100° C. in a tubular furnace to the flow of a gas mixture composed of $SiCl_4$ and $H_2$. After a reaction period of approximately one-half hour, a good adhering surface coating ($a$) of pure zirconium disilicide on top of the carbide was obtained.

*Example 6*

Graphite sleeves for use as cannings were coated with $TiSi_2$ as follows. The graphite tubes were immersed in a $TiSi_2$ melt heated to 1560° C. under a protective atmosphere of argon. The immersion was maintained only for a short period of approximately 30 seconds. It caused the silicide to penetrate into the pores of the graphite body ($c$). The work piece, still warm, was subsequently tempered in a furnace at 1400° C. for two hours in vacuum. As a result, the silicide was completely converted into carbide ($b$ on the drawing). The carbide-coated body was again immersed in titanium disilicide to obtain complete sealing of its surface. The carbide layer ($b$) and the disilicide layer ($a$) had a total thickness of approximately 80 to 120$\mu$.

*Example 7*

Graphite bodies in ball shape and tubular shape, were painted with a suspension consisting of 80% by weight of $CrSi_2$ and 20% SiC in a 10% solution of dextrin. The coated bodies were dried in a dryer cabinet at 110° C. and then heated under helium in some cases, and under argon in other cases, by direct resistance heating with the aid of high-frequency current at a temperature of approximately 1600° C. The bodies were kept at this temperature for 20 seconds. Thereafter the temperature was reduced to 1250° C. and maintained for 10 minutes in order to temper the body. After such processing the cooled work pieces comprised an intermediate carbide layer ($b$) of chromium carbide and silicon carbide. The coated graphite body thus obtained was given another coating formed of 90% by weight of $TiSi_2$ and 10% of $MoSi_2$ in a dextrin solution. After drying the coating, the body was heated for 30 seconds by high frequency in inert gas at 1550° C. A fused cover layer ($a$) was formed, consisting of an alloy of $TiSi_2$ and $MoSi_2$. The coatings were found to form a gas-tight seal as required for nuclear-reactor purposes.

*Example 8*

A tube of silicon carbide with a pore volume of 15% and a wall thickness of 2 mm. was sealed as follows. A coating of titanium was spread onto the work piece up to a thickness of 20$\mu$. The coated silicon carbide tube was heated in argon at 1600° C. for 15 minutes. This caused a reaction of the free carbon of the silicon carbide with the titanium to form additional SiC. Subsequently, the tubular work piece was immersed in a melt of zirconium silicide for 30 seconds at 1600° C. and was permitted to cool in a flow of argon. This resulted in the formation of a dense zirconium silicide cover layer.

We claim:

1. A shaped silicon carbide electrode body adaptable for use as an arc electrode, comprising a main structure of porous silicon carbide and an electrically conducting surface zone sealing said structure, said electrode body having at only one end thereof means for connection to a source of electricity, the other end thereof being free, said zone comprising an intermediate layer of refractory carbide bonded with said porous material and a cover layer bonded with said carbide layer and formed essentially of substance selected from the group consisting of alloys of and electrically conducting compounds with each other of metals in the $a$ groups from IVa to VIa of the periodic system and of silicides and nitrides of said metals.

2. In a shaped electrode body according to claim 1, said intermediate layer being formed essentially of substance selected from the group consisting of zirconium carbide, silicon carbide, titanium carbide and chromium carbide.

3. In a shaped electrode body according to claim 2, said cover layer being formed essentially of substance selected from the group consisting of the elements zirconium, silicon, titanium and alloys of said elements.

4. In a shaped electrode body according to claim 1, said surface zone comprising additional substance selected from the group consisting of compounds of said carbide-forming metals with nitrogen, beryllium, boron, aluminum, silicon and phosphorus.

5. In a shaped electrode body according to claim 1, said intermediate layer consisting essentially of titanium carbide, and said cover layer consisting of titanium.

6. In a shaped electrode body according to claim 1, said intermediate layer consisting essentially of titanium carbide, and said cover layer consisting of chromium.

7. In a shaped electrode body according to claim 1, said intermediate layer consisting essentially of titanium carbide, a third layer of titanium nitride being disposed between, and fusion-bonded with, said carbide layer and said cover layer.

8. A shaped electrode body, comprising a main structure of porous material selected from the group carbon, graphite and silicon carbide, said electrode body having at only one end thereof means for connection to a source of electricity, the other end thereof being free, a refractory intermediate layer essentially of vanadium carbide bonded to and enclosing said structure, and a second cover layer of chromium fusion-joined with said vanadium carbide layer and forming together therewith an electrically conducting and fluid-tight seal.

9. A shaped body having a porous main structure comprising a substance selected from the group consisting of carbon and silicon carbide and having a metallically conducting surface zone thereon resistant to oxidation and to penetration by coolants and moderators of nuclear reactors, said zone comprising an intermediate layer of refractory carbide bonded with said porous material and a cover layer of a substance selected from the group of metals consisting of titanium, zirconium, chromium, molybdenum and vanadium and their silicides and nitrides, said surface zone comprising also additional substance selected from the group consisting of compounds of said metals with nitrogen, beryllium, boron, aluminum, silicon and phosphorus.

10. A shaped electrode body of electrically conducting carbon-containing substance adaptable for use as electrode in an arc furnace, comprising a porous main structure of relatively high electrically conductive material selected from the group consisting of carbon and silicon carbide, said electrode body having at only one end thereof means for connection to a source of electricity, the other end thereof being free, and a metallic electrically conducting surface zone sealing said structure, said zone comprising an intermediate layer of refractory carbide bonded with said porous material and a cover layer bonded to said carbide layer and formed essentially of at least one substance selected from the group consisting of alloys of and electrically conducting compounds with each other of high-melting metals in the $a$ groups from IV$a$ to VI$a$ of the periodic system and silicon, and of silicides and nitrides of said metals, said refractory carbide being a carbide of one of said metals.

11. A shaped electrode body of electrically conducting carbon-containing substance adaptable for use as an arc electrode, comprising a porous main structure of relatively high electrically conductive material selected from the group consisting of carbon and silicon carbide, said electrode body having at only one end thereof means for connection to a source of electricity, the other end thereof being free, and a metallic electrically conducting surface zone sealing said structure and filling the adjacent pores of said material, said zone comprising an intermediate layer of refractory carbide bonded with said porous material and a cover layer bonded to said carbide layer and formed essentially of substance selected from the group consisting of alloys of and compounds with each other of metals in the $a$ groups from IV$a$ to VI$a$ of the periodic system and silicides and nitrides of said metals, said refractory carbide being a carbide of one of said metals.

12. A shaped body of electrically conducting carbon-containing substance adaptable for use as a structural component of nuclear reactor cores, comprising a porous main structure of electrically conductive material selected from the group consisting of carbon and silicon carbide and having a metallic electrically conducting surface zone thereon sealing said body and in direct thermal equilibrium therewith, said zone comprising a dense intermediate layer impervious to liquid and gas and bonded with said porous material and a cover layer bonded with said intermediate layer, said intermediate layer consisting essentially of refractory substance selected from the group consisting of the carbon-saturated carbides of zirconium, silicon, titanium and chromium, and said cover layer consisting essentially of at least one substance selected from the group of metals consisting of titanium, zirconium, chromium, molybdenum and vanadium and of silicides and nitrides of said metals, said surface zone comprising also additional substance selected from the group consisting of compounds of said metals with nitrogen, beryllium, boron, aluminum, silicon and phosphorus.

13. A shaped electrode body comprising a porous main structure of relatively high electrically conductive carbon-containing material and having at only one end thereof means for connection to a source of electricity, the other end being free, said main structure being provided with a first layer intimately bonded thereto and consisting essentially of at least one carbide selected from the group consisting of titanium carbide, chromium carbide, molybdenum carbide, silicon carbide, zirconium carbide; a second layer over and bonded to said first layer and consisting essentially of a highly electrically conductive layer of a substance selected from the group consisting of the elements molybdenum, chromium, titanium, zirconium, silicon and metallically conducting compounds of said elements with one of the further elements: nitrogen, beryllium, boron, aluminum, silicon and phosphorus.

14. A body as set forth in claim 13, said first layer additionally containing at least one metallically conducting combination selected from the group consisting of compounds of the elements molybdenum, chromium, titanium, zirconium, silicon with an element of the group: nitrogen, beryllium, boron, aluminum, silicon and phosphorus.

15. A body as set forth in claim 13, the bond between said second layer and said first layer being a fusion joint forming together with said two layers an electrically conducting and fluid-tight seal.

16. A body as set forth in claim 13, said first layer consisting essentially of titanium carbide and the second layer consisting essentially of titanium metal.

17. A body as set forth in claim 13, said first layer consisting essentially of titanium carbide and the second layer consisting essentially of chromium metal.

18. The body as set forth in claim 13, said first layer consisting essentially of titanium carbide, said structure being provided with a third layer consisting essentially of titanium nitride disposed between, and fusion-bonded with said first layer and said second layer.

19. A shaped electrode body, comprising a main structure of porous material selected from the group consisting of carbon, graphite and silicon carbide, said electrode body having at only one end thereof means for connection to a source of electricity, the other end thereof being free, a refractory intermediate layer of titanium carbide bonded to and enclosing said structure, and a dense cover layer of substance selected from the group consisting of titanium, titanium disilicide and titanium nitride, said two layers forming together an electrically conducting and fluid-tight seal.

20. A shaped electrode body, comprising a main structure of porous material selected from the group consisting of carbon, graphite and silicon carbide, said electrode body having at only one end thereof means for connection to a source of electricity, the other end thereof being free, a refractory intermediate layer essentially of chromium carbide bonded to and enclosing said structure, and a dense cover layer of chromium fusion-joined with said carbide layer and forming together therewith an electrically conducting and fluid-tight seal.

21. A shaped electrode body, comprising a main structure of porous material selected from the group consisting of carbon, graphite and silicon carbide, said electrode body having at only one end thereof means for connection to a source of electricity, the other end thereof being free, a refractory intermediate layer bonded to and enclosing said structure and consisting essentially of carbide and silicide of chromium and silicon, and a dense cover layer of titanium, said two layers forming together an electrically conducting and fluid-tight seal.

22. A shaped body, comprising a main structure of porous material selected from the group consisting of carbon, graphite and silicon carbide, a refractory intermediate layer of zirconium carbide bonded to and enclosing said structure, and a dense cover layer of zirconium disilicide fusion-joined with said carbide layer and forming together therewith an electrically conducting and fluid-tight seal.

23. A shaped body, comprising a main structure of porous material selected from the group consisting of carbon, graphite and silicon carbide, a refractory intermediate layer of chromium carbide and silicon carbon bonded to and enclosing said structure, and a dense cover layer of an alloy of titanium disilicide and molybdenum disilicide fusion-joined with said carbide layer and forming together therewith an electrically conducting and fluid-tight seal.

References Cited in the file of this patent

UNITED STATES PATENTS

| | | |
|---|---|---|
| 2,636,856 | Suggs et al. | Apr. 28, 1953 |
| 2,745,932 | Glaser | May 15, 1956 |
| 2,756,166 | Alexander et al. | July 24, 1956 |
| 2,822,301 | Alexander et al. | Feb. 4, 1958 |
| 2,866,724 | Alexander | Dec. 30, 1958 |
| 2,866,725 | Alexander | Dec. 30, 1958 |